US010302221B2

(12) United States Patent
Turner

(10) Patent No.: US 10,302,221 B2
(45) Date of Patent: May 28, 2019

(54) TESTING OF SAFETY DEVICES

(71) Applicant: Imtex Controls Limited, Leigh On Sea (GB)

(72) Inventor: Paul Turner, Deeside (GB)

(73) Assignee: IMTEX CONTROLS LIMITED, Leigh On Sea (GB)

( * ) Notice: Subject to any disclaimer, the term of this patent is extended or adjusted under 35 U.S.C. 154(b) by 232 days.

(21) Appl. No.: 15/440,941

(22) Filed: Feb. 23, 2017

(65) Prior Publication Data
US 2017/0268695 A1 Sep. 21, 2017

(30) Foreign Application Priority Data

Mar. 18, 2016 (GB) .................................. 1604645.0

(51) Int. Cl.
*F16K 37/00* (2006.01)
*F15B 19/00* (2006.01)
(Continued)

(52) U.S. Cl.
CPC ........ *F16K 37/0083* (2013.01); *F15B 19/005* (2013.01); *F16K 17/10* (2013.01);
(Continued)

(58) Field of Classification Search
CPC .... F16K 37/0083; F16K 17/10; F15B 19/005; G05B 19/0428; G05B 23/0256
See application file for complete search history.

(56) References Cited

U.S. PATENT DOCUMENTS 4,848,404 A * 7/1989 Hickok ............... E21B 33/0355
137/625.64
6,003,605 A * 12/1999 Dickson .................. E21B 34/10
166/324
(Continued)

FOREIGN PATENT DOCUMENTS

EP 2749970 A1 7/2014
WO 99/21066 A1 4/1999

OTHER PUBLICATIONS

Search Report Issued for related patent application No. GB1604645.0, dated Sep. 13, 2016.

*Primary Examiner* — Hezron E Williams
*Assistant Examiner* — David Z Huang
(74) *Attorney, Agent, or Firm* — Westman, Champlin & Koehler, P.A.; Z. Peter Sawicki

(57) ABSTRACT

Many operators choose not to utilise partial-stroke testing arrangements even when the equipment required for it to be performed is available, due to a perceived risk of over-travel and/or spurious trip. To alleviate this, we describe a safety valve system comprising a valve operable to move between an operating state and a safe state, a valve actuator operatively connected to the valve to control its state, and including a bias toward the safe state, a pair of drive members powered by a pressure media, each acting against the bias to urge the valve toward the operating state, a first control valve arranged to selectively convey pressure media to both drive members and to withdraw supply on receipt of a safety trigger, and a second control valve arranged to selectively convey pressure media to one drive member only of the pair and to withdraw supply on receipt of a test signal. In this way, a partial stroke test is possible via the second control (Continued)

valve, but the other drive member of the pair will remain active thus acting as a buffer that prevents excessive movement of the valve.

16 Claims, 2 Drawing Sheets

(51) Int. Cl.
  *G05B 19/042* (2006.01)
  *G05B 23/02* (2006.01)
  *F16K 17/10* (2006.01)
  *G05B 9/02* (2006.01)
  *G05B 19/46* (2006.01)
  *F15B 20/00* (2006.01)

(52) U.S. Cl.
  CPC ..... *G05B 19/0428* (2013.01); *G05B 23/0256* (2013.01); *F15B 20/00* (2013.01); *F15B 2211/30565* (2013.01); *F15B 2211/6336* (2013.01); *F15B 2211/7052* (2013.01); *F15B 2211/7056* (2013.01); *F15B 2211/8752* (2013.01); *F15B 2211/8755* (2013.01); *G05B 9/02* (2013.01); *G05B 19/46* (2013.01)

(56) References Cited

U.S. PATENT DOCUMENTS

| | | | |
|---|---|---|---|
| 2006/0185418 A1* | 8/2006 | Hoffman | G05B 23/0256 73/1.72 |
| 2009/0222233 A1 | 9/2009 | Tareg | |
| 2015/0000929 A1* | 1/2015 | Veeken | E21B 34/10 166/375 |

* cited by examiner

TESTING OF SAFETY DEVICES

FIELD OF THE INVENTION

The present invention relates to the testing of safety devices.

BACKGROUND ART

It is common to employ actuator-controlled valves in safety-critical industrial systems, such as the oil & gas, power generation and marine industries. Automated safety critical valves can be designed to operate as part of a closed loop system to prevent dangerous plant conditions from developing, for example opening to release a built-up overpressure, closing to shut down a specific line, or divert a hazardous process stream into a holding tank, or the like.

Such valves need to react immediately when called upon, but may be left uncalled-for and therefore in a fixed position for an extended period of time. Accordingly, there is a need to verify from time to time that the valve will function correctly during a safety demand. However, a full test of the valve would result in the plant in which it is fitted being shut down whilst the test is performed. This is intrinsically undesirable as it will disrupt the operation of the plant and reduce its productivity.

For this reason, so-called "Partial Stroke Testing" (PST) is employed in order to enable testing of the valve to occur without necessitating a plant shut down. PST involves moving a valve in the direction that it is required to move during a safety demand, but without fully operating it. This allows the valve to be tested without necessitating a plant shut down. WO99/21066 discloses a system of this type, useful for pneumatically-controlled valves.

SUMMARY OF THE INVENTION

Unfortunately, many operators choose not to utilise PST, even when the equipment required for it to be performed is available, because of the associated risk of the valve travelling too far during the test (so-called 'Over-travel'), and/or triggering an unnecessary plant shut down ('Spurious Trip'). The present invention seeks to alleviate this concern, thus allowing operators to get the full benefit of PST implementation.

The present invention therefore provides a safety valve system, comprising a valve operable to move between an operating state and a safe state, a valve actuator operatively connected to the valve to control its state, and including a bias toward the safe state, a pair of drive members powered by a pressure media, each acting against the bias to urge the valve toward the operating state a first control valve arranged to selectively convey pressure media to both drive members and to withdraw supply on receipt of a safety trigger, and a second control valve arranged to selectively convey pressure media to one drive member only of the pair, and to withdraw supply on receipt of a test signal. In this way, a partial stroke test is possible via the second control valve, but the other drive member of the pair will remain active thus acting as a buffer that prevents excessive movement of the valve.

The drive members are preferably pistons operating within bores, in which case the pressure media can be supplied to the bores on one side of the pistons. A suitable arrangement is for the bores to be co-axial. A single linkage can then be acted on by both pistons and (in turn) act upon the valve.

The second control valve can be arranged in series between the first control valve and the one drive member. The first control valve can convey pressure media via two conduits, one leading to each drive member, with the second control valve arranged on one of the conduits to selectively convey the pressure media to the one drive member.

The pressure media is ideally a gas, preferably air. The pressure media could alternatively be a liquid, for example an incompressible fluid such as hydraulic oil. We prefer the use of a pressure media that is pressurised to an elevated pressure. The first and/or the second control valves can be electro-pneumatic or electro-hydraulic valves, which are widely available.

The second control valve can be supplied with a test signal by a suitable control unit. This can receive a valve position signal from the valve, so that on movement of the valve the test can be ended. A threshold degree of partial movement of the valve can be defined, and the control unit then adapted to supply a test signal to the second control valve until the threshold has been reached.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
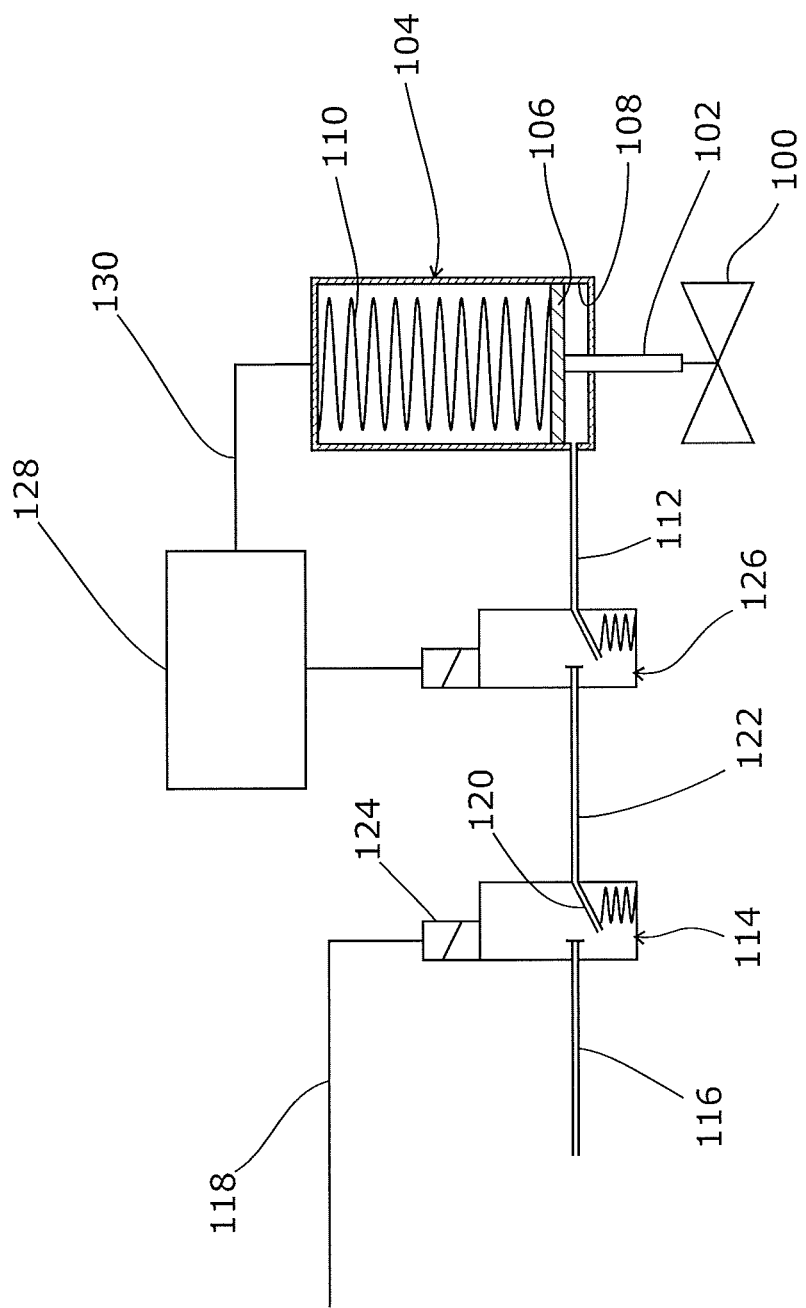
FIG. 1 shows a known system architecture for a pneumatically-controlled emergency valve system.

Referring to FIG. 1, a conventional pneumatically-controlled safety valve is shown. The basic principle of operation is that the valve 100, which may be of any suitable type, is movable between an operating state and a safe state by an operating mechanism 102. In FIG. 1, the operating mechanism is an actuator pushrod, but this is not especially crucial and may vary according to the specific operational need. For example, to drive a rotary valve, the mechanism may take the form of a rotating shaft as opposed to linear drive. The valve is usually held in its operating state, which may be any of a fully closed, fully open, or intermediate state as required for the proper operation of the process in which it is installed. Upon receipt of an emergency signal, the valve is moved to its safe state in which it performs a function aimed at safely controlling or shutting down the system.

The valve is controlled by an actuator 104 in the form of a piston 106 which operates the pushrod 102. The piston 106 moves within a bore 108 under the control of both a spring 110 and a source 112 of compressed fluid (such as air). These two act on the piston 106 in opposing senses, such that the spring 110 urges the piston towards a safe state for the valve 100 whilst the compressed fluid urges the piston 106 towards an operating state. By setting the forces exerted by the spring 110 and the compressed fluid 112 at appropriate levels, it can be arranged that the force exerted on the piston by the compressed fluid is able to overcome the spring, and thus the valve will stay in the operating state when the supply of compressed fluid is present, and will move to the safe state if the supply of compressed fluid is lost.

An alternative to the use of a compressed fluid is to use a low-pressure system such as a vacuum. Generally, however, the preference is to use a compressed air system, as a vacuum system is inherently limited to a maximum pressure of 1 atmosphere. The remainder of this description will refer to a compressed fluid supply but it should be understood as being applicable equally to a vacuum system.

This provides an efficient and fail-safe system. Many valves can be connected to the same supply of compressed fluid and triggered using either a common trigger signal or individual trigger signals, or a combination of both. To trigger a specific valve, the compressed fluid supply needs to be cut off and the fluid already in the actuator 104 allowed to vent (hence the preference toward use of compressed air as opposed to other gases or liquids). In addition, any fault in the compressed fluid supply will cause a general loss of pressure and the safety systems will trigger by default.

To control the actuator 104, a first Solenoid Operated Valve 114 is provided. This receives the compressed fluid supply 116 and an emergency trigger signal 118. It contains a normally-open valve 120 which, when closed, connects the compressed fluid supply 116 to a line 122 leading towards the actuator 104. When open, the valve 120 disconnects the line 122 from the compressed fluid supply 116 and vents the line 122 to allow pressure within it to be released. A spring or other biasing means urges the valve 120 toward an open state, and a solenoid actuator 124 urges the valve 120 towards a closed state when the emergency trigger signal 118 is in a "normal" or "hold" state, overcoming the spring 114. Thus, when the "normal" signal is lost or replaced by an "danger" signal, the solenoid actuator 124 will release the valve 120 allowing it to open, releasing the pressure in line 122 and allowing the actuator 104 to move the valve 100 out of its operating state into its safe state.

To allow testing of the actuator 104 and valve 100, there is a second Solenoid Operated Valve 126 on the line 122, in series between the first Solenoid Operated Valve 114 and the actuator 104. This is essentially identical to the first Solenoid Operated Valve 114 but under the control of a partial-stroke test (PST) controller 128. This also receives a feedback signal 130 from the actuator 104 (or the valve 100) showing the current position of the actuator 104 and valve 100. When a partial-stroke test is demanded, the PST Controller 128 enables the signal to the second Solenoid Operated Valve 126 to be changed to release the pressure in line 122. The spring 110 in the valve actuator 104 can start to move the valve 100 in the direction of the defined safe position. Once the valve 100 has moved a pre-defined amount, as detected by the feedback signal 130, the PST Controller 128 closes the second Solenoid Operated Valve 126 again, and thus returns the system to its 'hold' position, ready to react in the event of a Safety Demand.

In practice, the first and second solenoid-operated valves could be combined into a single unit have a corresponding functionality. However, we have shown them as separate units in this description so as to illustrate that functionality with clarity.

By moving the valve 100 only a small amount, there is little or no effect on the system behaviour as most valves have a dead zone at the start of their range of motion before an open valve is noticeably closed or before a closed valve begins to open. Thus a successful partial-stroke test confirms that the valve is able to move but does not cause any adverse effect on the system.

If a safety demand were to happen during the partial-stroke test, then the first Solenoid Operated Valve 114 would be opened, releasing the pressure supplied to the second Solenoid Operated Valve 126 via line 112. Thus, regardless of the state of the PST controller 128 and the second Solenoid Operated Valve 126, the pressure in the actuator 104 will be lost and the valve 100 will be put into its safe state.

We have noted that in such systems that if (for some reason) the PST Controller 128 should encounter an issue, such as the valve 100 "sticking" initially, then pressure in the actuator 104 can easily reduce to a level that can cause the actuator 104 to close the valve 100 beyond the partial-stroke test position, or even close the valve 100 unexpectedly. To overcome this, we have developed the arrangement shown in FIG. 2.

In the same manner as in FIG. 1, this system includes a safety critical valve 200 such as a ball valve, fitted with a fail-safe valve actuator 204, to be operated in one direction (the pressure stroke) by a fluid under pressure (such as compressed air) and in an opposite direction (the fail-safe direction) under the force exerted by a spring or other biasing means 210 (the spring stroke). The fluid under pressure is supplied under the control of a primary electro-pneumatic operator (such as a solenoid operated valve) 214, and a secondary electro-pneumatic operator 226 for delivering a partial stroke test when instructed, and a PST Controller 228 for running partial stroke testing.

Figure 2:
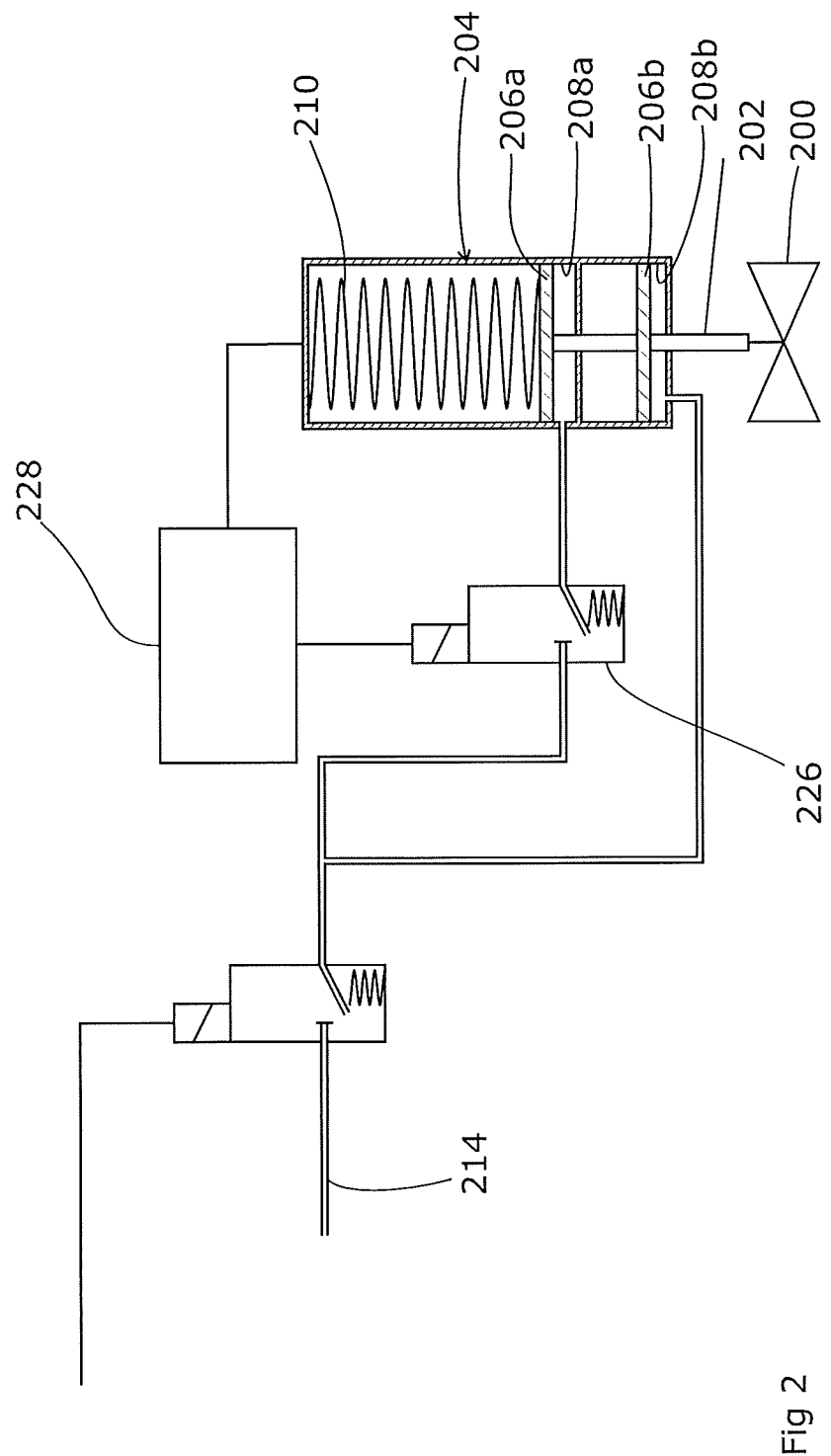
FIG. 2 shows a system architecture for a pneumatically-controlled emergency valve system according to the present invention.

The system of FIG. 2 differs in that the actuator 204 has two independently controllable pressurised bores 208*a* and 208*b*. Each bore has an operating piston 206*a*, 206*b*, and the actuator 204 is arranged such that both pistons must be pressurised in order for the actuator to be fully stroked to the position required to hold the valve 200 in its normal operating position. Pressure is supplied to both operating pistons 206*a*, 206*b* via the Primary SOV 214, and thus a safety trigger that actuates the primary SOV 214 will release the pressure in both pistons and move the valve 200 into its safe state.

The Secondary SOV 226 (under control of the PST controller 228) is fitted to only one of the pressurised chambers 208*a* of the actuator in such a way that only one of the operating pistons 206*a* in the actuator 204 can be affected by its operation when a partial stroke test (PST) is initiated. The other piston 206*b* will remain under whatever pressure is supplied by the primary SOV 214 under control of the safety system, notwithstanding operation of the secondary SOV 226 under the control of the PST Controller 228.

When PST is initiated, an instruction from the PST Controller 228 causes the Secondary SOV 226 to change state such that the pressurised chamber 208*a* that it is connected to (and only this chamber) is de-pressurised. This allows the spring 210 in the actuator 204 to start moving the actuator 204 and valve 200 connected to it in the direction of the safe position for the system. Under normal operation, the PST Controller 228 will allow the actuator 204 and valve 200 to move to a pre-defined position (the 'PST Position') before changing the state of the Secondary SOV 226, re-pressurising the chamber 208*a* that it is connected to, along with the associated operating piston 206*a*, and returning the system to the position required during normal operation.

However, whilst the spring 210 is moving the actuator 204 and valve 200 to the PST position, it will also be driving the other operating piston 206*b* in the actuator 204 in the direction of the safe position for the system. The operating media in the pressure chamber 208*b* containing this piston 206*b* will be further compressed as the spring 210 drives the actuator 204 and valve 200 to the PST Position, further increasing the pressure in the chamber 208*b*.

In the event of a problem occurring during the PST, such as the valve 200 sticking initially before 'jumping' out of its seat, the pressure on non-depressurised piston 206b of the actuator 204 that has increased as the actuator 204 and valve 200 move to the PST Position now acts as a brake for how far the actuator 204 can physically travel before the increasing pressure produces a sufficient force to stop the actuator 204 and valve 200 from moving further. Even if the Secondary SOV 226 should fail and pressure cannot be returned to piston 206a, the Valve 200 cannot close beyond a certain point, related to the force of the spring in the Actuator and the pressure on piston 206b. Thus, there is no possibility of a PST causing the Valve 200 to over-travel or cause a spurious trip event on the system.

If a safety demand should occur whilst the valve 200 is in a partially closed position reached during a problematic PST, then the Primary SOV 214 will de-energise, de-pressurising piston 206b and allowing the valve 200 to move to its safe position under the force of the spring in the Actuator.

One arrangement for the actuator 204 including two pressurised chambers is shown in FIG. 2. The two chambers 208a, 208b are aligned co-axially, and a single pushrod 202 extends from the piston 206a in chamber 208a, into and through chamber 208b where it is also connected to piston 206b, and then out of the actuator 204 to connect to the valve 200. Other arrangements are of course possible.

It will of course be understood that many variations may be made to the above-described embodiment without departing from the scope of the present invention. For example the invention could be applied to an arrangement where the pressure media is a liquid, for example an incompressible fluid such as hydraulic oil.

The invention claimed is:

1. A safety valve system, comprising;
    a valve operable to move between an operating state and a safe state,
    a valve actuator operatively connected to the valve to control its state, and including;
        a bias toward the safe state,
        a pair of drive members powered by a pressure media, each acting against the bias to urge the valve toward the operating state
    a first control valve arranged to selectively convey pressure media to both drive members and to withdraw supply on receipt of a safety trigger, and
    a second control valve arranged to selectively convey pressure media to one drive member only of the pair, and to withdraw supply on receipt of a test signal.

2. The safety valve system according to claim 1 in which the drive members are pistons operating within bores and the pressure media is supplied to the bores on one side of the pistons.

3. The safety valve system according to claim 2 in which the bores are co-axial.

4. The safety valve system according to claim 3 in which a single drive linkage is acted on by both pistons and acts upon the valve.

5. The safety valve system according to claim 4 in which the single drive linkage is a pushrod.

6. The safety valve system according to claim 4 in which the single drive linkage is a rotating shaft.

7. The safety valve system according to claim 1 in which the pair of drive members act in combination against the bias to urge the valve toward the operating state.

8. The safety valve system according to claim 1 in which the second control valve is arranged in series between the first control valve and the one drive member.

9. The safety valve system according to claim 1 in which the first control valve conveys pressure media via two conduits, one leading to each drive member, and the second control valve is arranged on one of the conduits to selectively convey the pressure media to the one drive member.

10. The safety valve system according to claim 1 in which the pressure media is a gas.

11. The safety valve system according to claim 1 in which the pressure media is air.

12. The safety valve system according to claim 1 in which the pressure media is pressurised to an elevated pressure.

13. The safety valve system according to claim 1 in which the first and/or the second control valves are electro-pneumatic or electro-hydraulic valves.

14. The safety valve system according to claim 1 in which the second control valve is supplied with a test signal by a control unit.

15. The safety valve system according to claim 14 in which the control unit receives a valve position signal from the valve.

16. The safety valve system according to claim 14 in which the control unit is adapted to supply a test signal to the second control valve until the valve position signal has changed by more than a preset threshold.

* * * * *